(12) United States Patent
Eriksson et al.

(10) Patent No.: US 9,049,003 B2
(45) Date of Patent: Jun. 2, 2015

(54) METHODS AND ARRANGEMENTS IN A TELECOMMUNICATION SYSTEM FOR SENDING FEEDBACK DATA AND USER DATA ON A COMBINED FEEDBACK AND DATA CHANNEL

(75) Inventors: Erik Eriksson, Linköping (SE); Fredrik Huss, Sundbyberg (SE); Daniel Larsson, Solna (SE)

(73) Assignee: IDTP Holdings, Inc., Wilmington, DE (US)

( * ) Notice: Subject to any disclaimer, the term of this patent is extended or adjusted under 35 U.S.C. 154(b) by 320 days.

(21) Appl. No.: 13/120,359

(22) PCT Filed: Apr. 28, 2009

(86) PCT No.: PCT/SE2009/050446
§ 371 (c)(1),
(2), (4) Date: Mar. 22, 2011

(87) PCT Pub. No.: WO2010/036177
PCT Pub. Date: Apr. 1, 2010

(65) Prior Publication Data
US 2011/0170514 A1 Jul. 14, 2011

Related U.S. Application Data

(60) Provisional application No. 61/099,252, filed on Sep. 23, 2008.

(51) Int. Cl.
*H04W 4/00* (2009.01)
*H04L 5/00* (2006.01)
*H04L 1/16* (2006.01)
*H04L 1/18* (2006.01)
*H04W 72/06* (2009.01)
(Continued)

(52) U.S. Cl.
CPC ............ *H04L 5/0096* (2013.01); *H04W 72/06* (2013.01); *H04L 1/0003* (2013.01); *H04L 1/0009* (2013.01); *H04L 1/0026* (2013.01); *H04L 1/0027* (2013.01); *H04L 1/0028* (2013.01); *H04L 1/0073* (2013.01); *H04L 1/1664* (2013.01); *H04L 1/1671* (2013.01); *H04L 1/1819* (2013.01); *H04L 5/0053* (2013.01); *H04L 25/03343* (2013.01); *H04L 2001/125* (2013.01); *H04L 2025/03802* (2013.01)

(58) Field of Classification Search
None
See application file for complete search history.

(56) References Cited

U.S. PATENT DOCUMENTS 7,852,743 B2 * 12/2010 Kwon et al. ............ 370/203
7,929,415 B2 * 4/2011 Kwak et al. ............ 370/208
(Continued)

OTHER PUBLICATIONS

3rd Generation Partnership Project. "Multiplexing Method of Shared Control Channel in Uplink Single-Carrier FDMA Radio Access." TSG-RAN WG1 #42bis, R1-051143, San Diego, USA, Oct. 10-14, 2005.
(Continued)

*Primary Examiner* — Bob Phunkulh
(74) *Attorney, Agent, or Firm* — Condo Roccia Koptiw LLP (57) ABSTRACT

A method and an arrangement (400, 600) in a first and second node, respectively, are provided. In a step (220), the first node (110) sends a plurality of resource units in a time period on a combined feedback and data channel. Said plurality of resource units comprises information about feedback data and user data. At least a minimum number of resource units are reserved for allocation by the user data.

21 Claims, 5 Drawing Sheets

(51) Int. Cl.
   *H04L 1/00* (2006.01)
   *H04L 25/03* (2006.01)
   *H04L 1/12* (2006.01)

(56) References Cited

U.S. PATENT DOCUMENTS

| | | | | |
|---|---|---|---|---|
| 8,000,258 B2* | 8/2011 | Ko et al. | | 370/252 |
| 8,184,544 B2* | 5/2012 | Ko et al. | | 370/249 |
| 8,509,160 B2* | 8/2013 | Kotecha | | 370/329 |
| 2008/0219370 A1* | 9/2008 | Onggosanusi et al. | | 375/260 |
| 2009/0046805 A1* | 2/2009 | Kim et al. | | 375/295 |
| 2009/0052405 A1* | 2/2009 | Ko et al. | | 370/335 |
| 2009/0059844 A1* | 3/2009 | Ko et al. | | 370/328 |
| 2010/0029320 A1* | 2/2010 | Malladi et al. | | 455/522 |
| 2010/0085912 A1* | 4/2010 | Chun et al. | | 370/328 |
| 2010/0091755 A1* | 4/2010 | Kwon et al. | | 370/344 |
| 2010/0183086 A1* | 7/2010 | Ko et al. | | 375/260 |
| 2011/0249629 A1* | 10/2011 | Ko et al. | | 370/329 |

OTHER PUBLICATIONS

3rd Generation Partnership Project. "CQI Feedback Scheme for EUTRA." 3GPP TSG RAN1#43, R1-051334, Seoul, Korea, Nov. 7-11, 2005.

3rd Generation Partnership Project. "Further Considerations on Multiplexing Method of Shared Control Channel in Uplink Single-Carrier FDMA." TSG-RAN WG1 #43, R1-051430, Seoul, Korea, Nov. 7-11, 2005.

* cited by examiner

Control region
(1-4 OFDM symbols)

One subframe

Control signaling   Reference symbols

Fig. 3

Chanel-Quality Indicator, Precoding Matrix Indicator
Rank Indicator
Hybrid-ARQ acknowledgement UL-SCH data 1 ms subframe Reference signal

METHODS AND ARRANGEMENTS IN A TELECOMMUNICATION SYSTEM FOR SENDING FEEDBACK DATA AND USER DATA ON A COMBINED FEEDBACK AND DATA CHANNEL

FIELD OF THE INVENTION

The present invention relates to a method and arrangement in a telecommunication system, in particular to methods and arrangements for improved usage of the Physical Uplink Shared Channel in E-UTRAN.

More specifically, the present invention relates to a method and arrangement in a first node for sending feedback data and user data on a combined feedback and data channel, and to a method and arrangement in a second node for sending feedback data and user data on a combined feedback and data channel.

BACKGROUND

Figure 1:
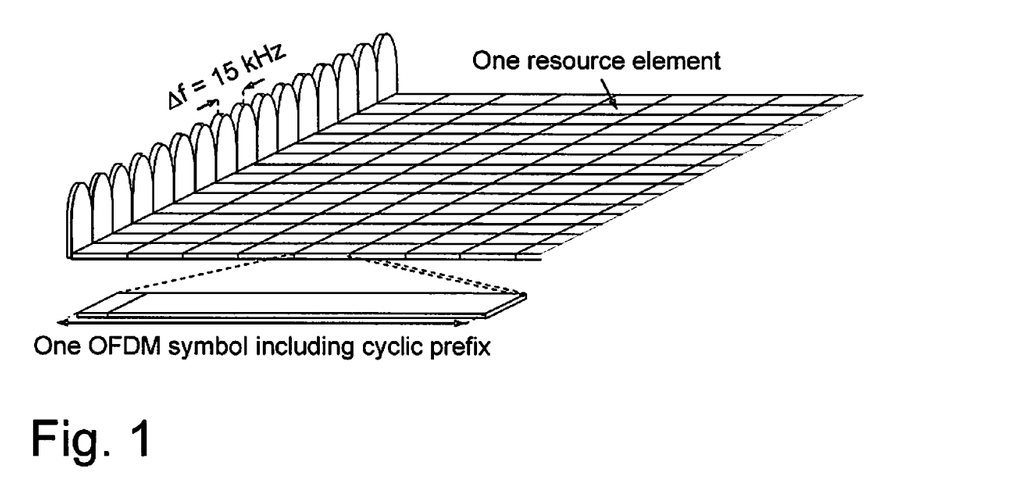
FIG. 1 illustrates in a time-frequency grid the downlink physical resources in an E-UTRAN.
Figure 2:
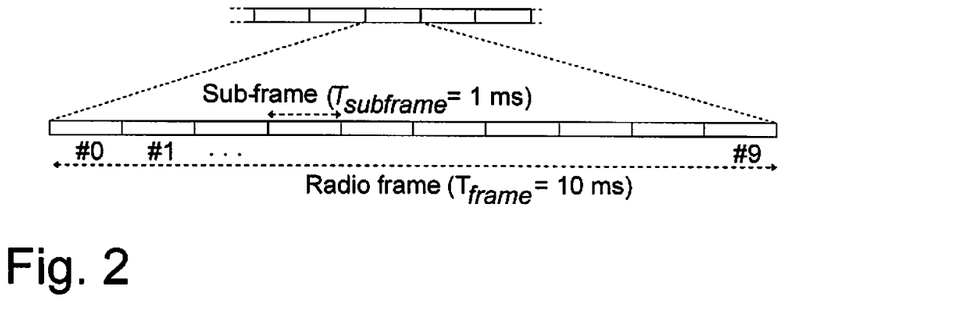
FIG. 2 illustrates the LTE time-domain structure.

Long-Term Evolution (LTE) of UTRAN (also denoted E-UTRAN) uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain (cf. FIG. 2), LTE downlink transmissions are organized into radio frames of 10 ms, each radio frame consisting of ten equally-sized subframes of length $T_{subframe}$=1 ms for frequency division duplex (FDD).

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Figure 3:
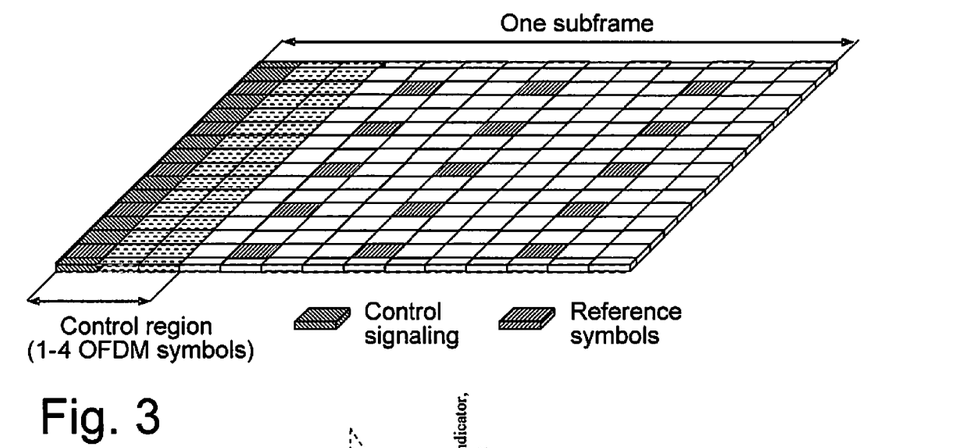
FIG. 3 illustrates the LTE downlink subframe.

Downlink transmissions are dynamically scheduled, i.e. in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 3.

LTE uses hybrid-ARQ, where, after receiving downlink data in a subframe, the terminal attempts to decode it and reports to the base station whether the decoding was successful (ACK) or not (NAK). In case of an unsuccessful decoding attempt, the base station can retransmit the erroneous data.

Uplink control signaling from the terminal to the base station consists of hybrid-ARQ acknowledgements for received downlink data;
terminal reports related to the downlink channel conditions, used as assistance for the downlink scheduling;
scheduling requests, indicating that a mobile terminal needs uplink resources for uplink data transmissions.

There are two different cases for transmitting uplink control signaling and which to use depends on whether the terminal is simultaneously transmitting data in the uplink. Both of the methods are supported by all terminals (a) No simultaneous transmission of data and control:
In case the terminal does not transmit data at the same time as control, control signaling is transmitted on the Physical Uplink Control Channel (PUCCH). The resource used for control channel transmissions is either indicated by the downlink transmission from with the control information resides or is semi-statically configured. With the exception of an aperiodic CSI (CQI/PMI/RI) scheduled without data transmission (CQI-only). Then the PUSCH will be used with the resource indicated in the grant message.

(b) Simultaneous transmission of data and control:
In case the terminal simultaneously need to transmit uplink control information and data, control and data are multiplexed prior to transmission and transmitted on the Physical Uplink Shared Channel (PUSCH).

Figure 4:
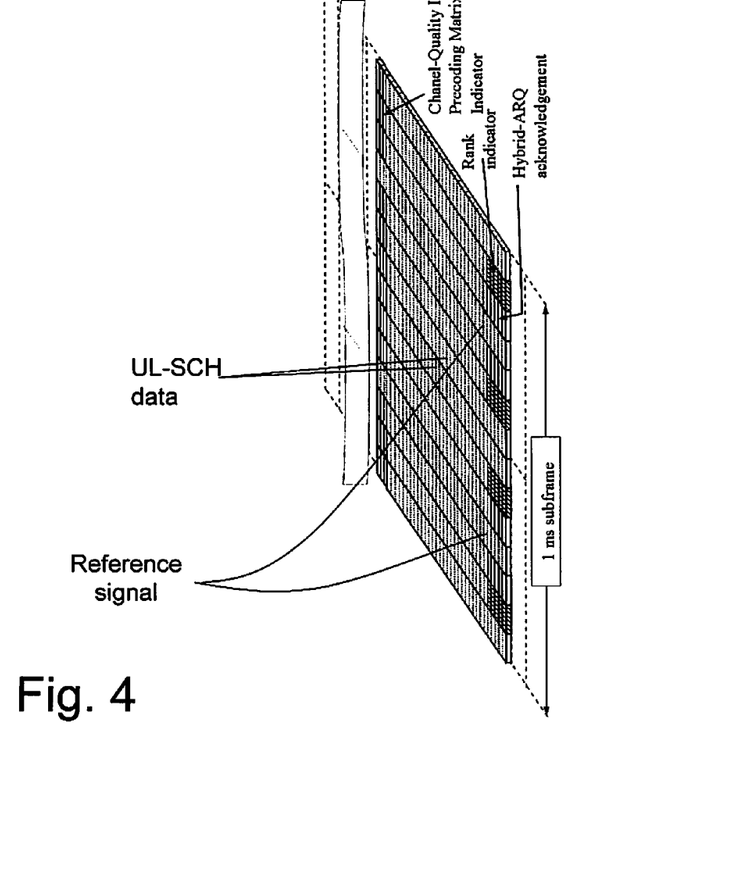
FIG. 4 illustrates the uplink subframe with control for normal cyclic prefix.

If the mobile terminal has been assigned an uplink resource for data transmission and at the same time instance has control information to transmit, it will transmit the control information together with the data. The control information can consists of ACK/NAK feedback for the downlink transmission, channel quality indicator (CQI), precoding matrix indicator PMI and rank indicator (RI). FIG. 4 illustrates the position of data and the different control types in one subframe from one mobile terminal. As illustrated in FIG. 4, CQI and PMI is jointly coded and uses the same set of resource elements. Scheduling requests are not transmitted together with uplink data, instead is a buffer status report transmitted jointly coded with the data if it has been triggered. CQI/PMI can be requested by a bit in the uplink grant. The CQI/PMI format used for requested reports is frequency selective while periodic reports configured on PUCCH is smaller but often non-selective.

The different control types are multiplexed with data differently. The amount of resources used for CQI/PMI and RI is taken into account when data is placed in the subframe so that data is only placed at the positions not allocated by CQI/PMI and RI. The ACK/NACK then overwrites the data and possible also CQI/PMI.

Figure 5:
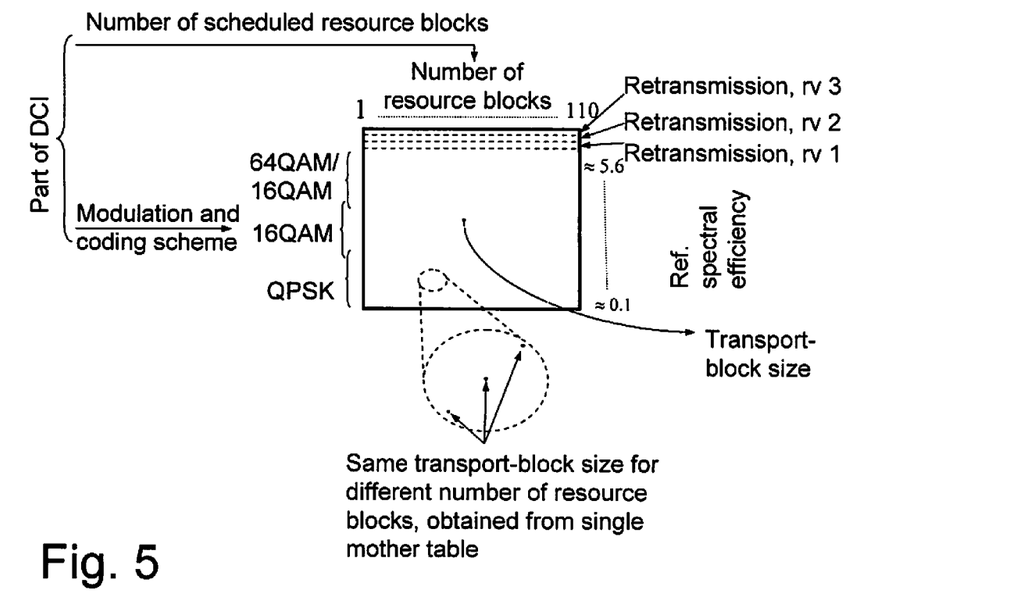
FIG. 5 illustrates a TBS (Transport Block Size) table layout.

The amount of data that is transmitted within assigned resource blocks in uplink is indicated by the number of resource blocks assigned and a modulation coding scheme, as illustrated in FIG. 5. One of the principles behind this design is that the amount of resources blocks assigned to the uplink transmission should be independent from the set of possible code rates, i.e. the same code rates for data is available independent from the number of resource blocks assigned (slight differences exists).

The amount of control information that is transmitted together with data is determined by the code rate of data, without taking the amount of control information into account. Since the data on PUSCH is protected by the HARQ protocol it is usually operated at a high error rate than required for the ACK/NAK, CQI/PMI and RI. Therefore it is possible to configure an offset so that control is given a lower code rate than data by a certain number of dB.

It is possible to send reports regarding downlink channel condition on PUSCH also without data, indicated by a special point in the MCS table. If other control information is multiplexed with such a transmission the code rate of that control information is dependent on the code rate of CQI/PMI instead of data.

The CQI/PMI fields is the by far the large possible control field as it can consist of as much as 5000 coded bits, as compared to the RI and ACK/NACK which is up to about 400 coded bits.

In 3GPP contribution R1-082923, there is proposed to adopt the definition of code rate in the control information MCS calculation formulation. The proposed definition of code rate is based on the payload size of data including any CRC, the payload size of CQI/PMI including CRC if any, the payload size of Rank information, the number of usable resource elements in the PUSCH transmission, the modulation order, and the offset value of CQI/PMI and Rank, respectively. The purpose of this proposal is to reduce for example problems related to the fact that the code rate, at which the number of resource elements to be used by the control information, is derived from a "virtual" code rate of data, i.e data and control are "rate matched" into the PUSCH, so the data encoded bits will actually never occupy the entire PUSCH.

SUMMARY

If a mobile terminal is only assigned a few resource blocks and a low code rate together with large CQI/PMI report it will in principle only transmit the CQI/PMI and no data.

The reason that this is problematic from a performance view is that the CQI/PMI report can not be sent together with a small data package such as TCP ACK or a buffer status report, if a few number of resource blocks has been assigned to the mobile terminal.

In order for the base station to operate a frequency selective scheduler it will require the CQI reports with high periodicity. Since the TCP ACKs can not be send together with the CQI reports with the current design it will force the eNB to not having the frequency selective CQI reports or requesting them separately. Not having frequency selective reports could loss as much as 10-20% in downlink cell capacity. Requesting CQI separately will cost both in uplink resources and downlink control signaling, possible resulting in an even higher capacity loss.

Another issue is that when requesting CQI reports, there is often room to send a small data package or a buffer status report if the channel quality is good enough. Allowing this to be sent would reduce latency since the mobile terminal otherwise have to first send a scheduling request.

The above mentioned contribution R1-082923 addresses a related problem. However the solution is faulty, because the amount of RI information bits will be dependent on the amount of CQI/PMI information bits. The problem with this is that the RI value indicates the amount of CQI/PMI information bits. The intention in said document is to limit the drift in code rate offset for small allocations but it does not address the problem with the smaller transport formats, that more CQI/PMI symbols can be generated than the actual resource elements assigned can support.

Therefore, an object of the present invention is to increase performance and flexibility of the downlink in a wireless communication system.

As it is inter alia the amount of CQI/PMI symbols that has been identified to be the cause of the problems mentioned above, it is an idea of the present invention to limit the amount of resource elements, or more generally resource units, used for, e.g., the CQI/PMI when transmitted on a combined control and user data channel, such as PUSCH, together with user data.

According to an aspect of the invention, the object is achieved by a method in a first node, such as a mobile terminal, for sending feedback data and user data on a combined feedback and data channel to a second node, such as a radio network node. The feedback data is indicative of channel properties of a data channel for sending data from the second node to the first node. A wireless communication system comprises the first and second nodes. In a step, the first node sends a plurality of resource units in a time period on the combined feedback and data channel. Said plurality of resource units comprises information about feedback data and user data. At least a minimum number of resource units are reserved for allocation by the user data.

According to another aspect of the invention, the object is achieved by an arrangement in a first node, such as a mobile terminal, for sending feedback data and user data on a combined feedback and data channel to a second node, such as a radio network node. The first node may comprise the arrangement. The feedback data is indicative of channel properties of a data channel for sending data from the second node to the first node. A wireless communication system is configured to comprise the first and second nodes. The arrangement may comprise a sending unit configured to send a plurality of resource units in a time period on the combined feedback and data channel. Said plurality of resource units comprises information about feedback data and user data. At least a minimum number of resource units are reserved for allocation by the user data. Optionally, the arrangement may comprise a receiving unit and/or a processing unit.

According to a further aspect of the invention, the object is achieved by a method in a second node, such as a radio network node, for receiving feedback data and user data on a combined feedback and data channel from a first node, such as a mobile terminal. The feedback data is indicative of channel properties of a data channel for sending data from the second node to the first node. A wireless communication system comprises the first and second nodes. In a step, the second node receives a plurality of resource units in a time period of the combined feedback and data channel. Said plurality of resource units comprises information about feedback data and user data. At least a minimum number of resource units are reserved for allocation by the user data.

According to yet another aspect of the invention, the object is achieved by an arrangement in the second node, such as a radio network node, for receiving feedback data and user data on a combined feedback and data channel from a first node, such as a mobile terminal. The second node may comprise the arrangement. The feedback data is indicative of channel properties of a data channel for sending data from the second node to the first node. A wireless communication system is configured to comprise the first and second nodes. The arrangement may comprise a receiving unit configured to receive a plurality of resource units in a time period of the combined feedback and data channel. Said plurality of resource units comprises information about feedback data and user data. At least a minimum number of resource units are reserved for allocation by the user data. Optionally, the arrangement comprises a sending unit and/or a processing unit.

It may be noted that, in some embodiments, the resource unit may be a resource element, which is known from LTE terminology.

The first and second nodes use corresponding methods for sending and receiving, respectively, feedback data and user data on a combined feedback and data channel, wherein at least a minimum number of resource units are reserved for allocation by the user data. Advantageously, it is assured that at least some user data is transferred in each time period of the combined feedback and data channel. Thereby, the above mentioned object is achieved.

Further features of, and advantages with, the present invention will become apparent when studying the appended claims and the following description. It is to be understood that different features of the present invention may be combined to create embodiments other than those described in the following, without departing from the scope of the present invention, as defined by the appended claims.

DETAILED DESCRIPTION

As noted above, a resource block corresponds to one slot (0.5 ms) in the time domain and 12 contiguous subcarriers in the frequency domain. Moreover, resource blocks are normally numbered in the frequency domain, starting with 0 from one end of the system bandwidth.

In LTE, a resource unit may be referred to as a resource element and 12×7 resource elements may be comprised in a resource block. A resource element corresponds to one OFDM subcarrier during one OFDM symbol interval. The smallest unit for scheduling is 12×14 resource elements, i.e. two consecutive resource blocks. Hence, a resource unit, in general, may comprise one or more OFDM subcarriers during one or more OFDM symbol intervals.

As the code rate of the data is independent on how many resource blocks a mobile terminal is assigned in uplink, the number of control bits will also be independent from the number of physical resource blocks, which is associated with several problems. The CQI/PMI field is the far largest field and thus the most problematic. However, although the following detailed description addresses the identified problems by means of the CQI/PMI field as an example, embodiments of the present invention are not restricted to this field but other control fields can be handled similarly.

As it is inter alia the amount of CQI/PMI symbols that has been identified to be the cause of the problems mentioned above, it is the basic idea of some embodiments of the present invention to limit the amount of resource elements used for, e.g., the CQI/PMI when transmitted on PUSCH together with data. The following relates to methods to limit the amount of coded CQI/PMI symbols and still keep the current structure with linking the amount of CQI/PMI symbols with the code rate of data.

In some embodiments, there is provided a method in a mobile terminal for sending control information together with data. The method comprises a step of limiting the amount of resource elements used for CQI/PMI, wherein the limitation of the amount of resource elements is based on one or more of a constant value, as a ratio of the number of resources allocated in resource assignment, dependent on the transport block size for data, amount of coded RI symbols and/or the amount of CQI/PMI and/or RI information bits. Furthermore, the method comprises a step of sending data and CQI/PMI on PUSCH.

According to a first embodiment of the present invention, the limit can either be set as a constant value independent from the number of resources allocated or as a ratio of the number of resources allocated in the resource assignment. The limit can also be dependent on other factors like transport block size for data.

One example is described in the equation below. In this case the mobile terminal can only allocate half the resource elements to CQI/PMI $$Q' = \min\left(\left\lceil \frac{(O+L) \cdot M_{SC}^{PUSCH} \cdot N_{symb}^{PUSCH}}{10^{\frac{-\Delta_{offset}^{PUSCH}}{10}} \cdot \sum_{r=0}^{C-1} K_r} \right\rceil, \left\lceil \frac{M_{SC}^{PUSCH} \cdot N_{symb}^{PUSCH}}{2} \right\rceil\right),$$

where the notation is defined in the document 3GPP 36.212. This will lead to a monotonically decreasing code rate for data with decreasing transport block size selection. This will also keep higher transport formats unaffected.

It is further possible to take into account the amount of coded RI symbols when limiting the amount of coded CQI/PMI symbols as in the equation below $$Q' = \min\left(\left\lceil \frac{(O+L) \cdot M_{SC}^{PUSCH} \cdot N_{symb}^{PUSCH}}{10^{\frac{-\Delta_{offset}^{PUSCH}}{10}} \cdot \sum_{r=0}^{C-1} K_r} \right\rceil, \left\lceil \frac{M_{SC}^{PUSCH} \cdot N_{symb}^{PUSCH}}{2} \right\rceil\right)$$

Another embodiment of the present invention is to take into account the amount of CQI/PMI and/or RI information bits when calculating the code rate for CQI/PMI. This will reduce the number of symbols allocated to CQI/PMI as the number of CQI/PMI information bits increases. It is further possible to combine this option with the ones above, as in the following equation $$Q' = \min\left(\left\lceil \frac{(O+L) \cdot M_{SC}^{PUSCH} \cdot N_{symb}^{PUSCH}}{10^{\frac{-\Delta_{offset}^{PUSCH}}{10}} \cdot \sum_{r=0}^{C-1} K_r + O + L} \right\rceil, M_{SC}^{PUSCH} \cdot N_{symb}^{PUSCH} - Q'_{RI}\right).$$

Embodiments of the present invention thus allow small amounts of data to be transmitted together with CQI/PMI report in the case few resource blocks are assigned to a mobile terminal. Hence, this allows for high CQI reporting frequency on PUSCH at low cost, therefore increasing the overall cell performance of up to 10-20%. It will also reduce latency by allowing small data packages or buffer status reports to be sent immediately in CQI reports.

Throughout the following description similar reference numerals have been used to denote similar elements, parts, items, nodes, arrangements or features, when applicable.

Figure 6:
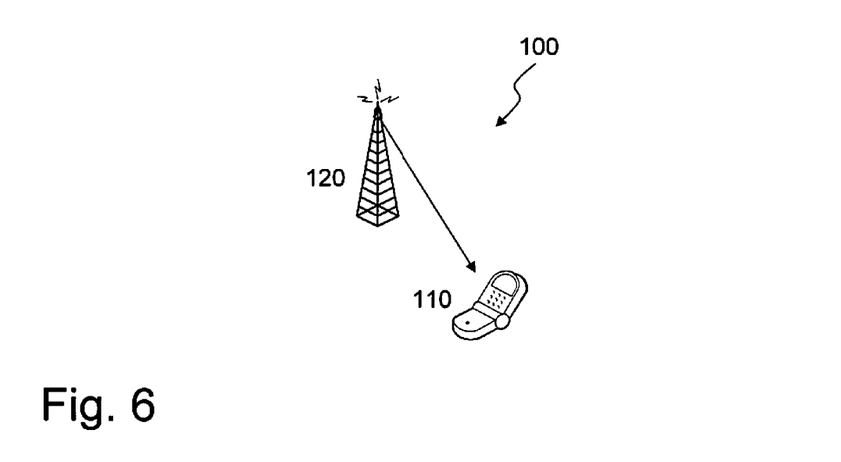
FIG. 6 shows an exemplifying, schematic overview of a radio communication system, in which the present invention may be implemented.

FIG. 6 shows an exemplifying, schematic overview of a radio communication system, in which the present invention may be implemented. It may, in some embodiments, be preferred that the radio communication system 100 is a SAE/LTE system, an LTE-advance system or the like. The radio communication system 100 may comprise a first node 110, such as a mobile terminal. It may be noted that the first node may be a first network node, a first radio network node, a cellular phone, a PDA, user equipment or the like. Furthermore, the radio communication system 100 may comprise a second node 120, such as a radio network node. It may be noted that the second node may be a second network node, a second radio network node, a radio base station, an evolved- NodeB, a radio network controller or the like. The first node 110 is served by the second node 120.

Figure 7:
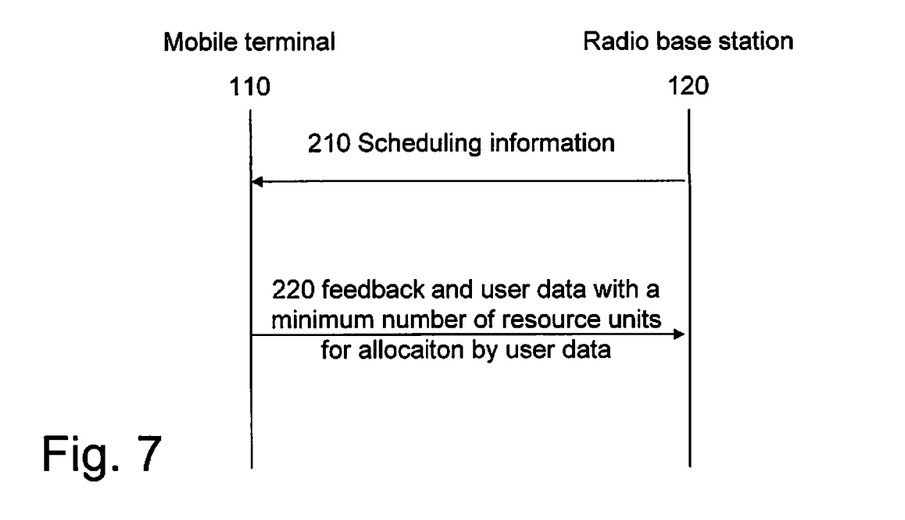
FIG. 7 shows a schematic combined signaling and flow chart of an embodiment of the method performed in the radio communication system according to FIG. 6.

Referring to FIG. 7, there is shown a schematic combined signaling and flow chart of an embodiment of the method in the radio communication system 100 according to FIG. 6 for sending feedback data and user data on a combined feedback and data channel to a second node 120. The feedback data is indicative of channel properties of a data channel for sending data from the second node 120 to the first node 110.

It may be noted that channel properties in some contexts may be referred to as channel characteristics and/or channel state information.

In some embodiments of the method in the radio communication system 100, feedback data comprises one or more of CQI, PMI and RI.

In some embodiments of the method in the radio communication system 100, wherein the radio communication system 100 is a SAE/LTE system, it may be preferred that the feedback and data channel comprises a Physical Uplink Shared Control Channel (PUSCH) or the like.

It may be noted that the first and second nodes 110, 120 are configured to use corresponding methods for reserving a minimum number of resource units for allocation by user data. The minimum number of resource units may be configurable by the wireless network or may be defined according to a standard specification.

In an optional step 210, the first node 110 receives scheduling information from the second node 120. The scheduling information indicates resource units of the combined feedback and data channel available for use in a subsequent step of sending a plurality of resource units. The scheduling information may also indicate the number of data bits to send using the indicated, available resource units. Optionally, the plurality of resource units comprises at least some of the resource units indicated by the scheduling information. In LTE, a resource unit may be referred to as a resource element and 12×7 resource elements are comprised in a resource block. The smallest unit for scheduling is 12×14 resource elements, i.e. two consecutive resource blocks.

In a step 220, the first node 110 sends a plurality of resource units in a time period on the combined feedback and data channel. Said plurality of resource units comprises information about feedback data and user data. At least a minimum number of resource units are reserved for allocation by the user data. Thus, the first node 110 reserves a minimum number of resource units for allocation by the user data. Expressed differently, there is a limit for the amount of coded CQI/PMI symbols. The limit may be set as a constant value, as a ratio of the number of resources allocated in resource assignment, dependent on the transport block size for data, amount of coded RI symbols and/or the amount of CQI/PMI and/or RI information bits. In LTE, a time period may be referred to as a subframe.

Figure 8:
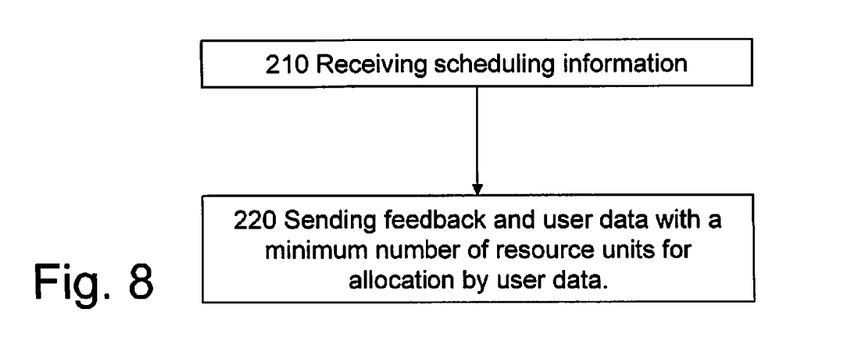
FIG. 8 shows a schematic flow chart over an embodiment of the method in the first node.

In FIG. 8, there is shown a schematic flow chart over an embodiment of the method in the first node 110, such as a mobile terminal, for sending feedback data and user data on a combined feedback and data channel to a second node 120, such as a radio network node. The feedback data is indicative of channel properties of a data channel for sending data from the second node 120 to the first node 110. A wireless communication system 100 comprises the first and second nodes 110, 120. The following step may be performed.

In a step 220, the first node 110 sends a plurality of resource units in a time period on the combined feedback and data channel. Said plurality of resource units comprises information about feedback data and user data. At least a minimum number of resource units are reserved for allocation by the user data.

In some embodiments of the method in the first node 110, the minimum number of resource units is based on a predetermined number of resource units. Advantageously, simple implementation of the method may be obtained since the predetermined number is static and may be configured in the first node in conjunction with manufacturing of the first node. In this manner, signaling is only increased during configuration of the network, or the radio communication system. The predetermined number of resources may be determined by a standard specification or may be configured by the wireless network.

In some embodiments of the method in the first node 110, the minimum number of resource units is based on a ratio of an assigned number of resource units and a dynamic or predetermined numerical value, wherein the assigned number of resource units is assigned by a scheduler, comprised in the second node 120. In this manner, the minimum number of resource units changes as a result of different number of assigned resource units. For example, when the number of assigned resource units is fairly small, it is implied that there is less room for feedback data. With this embodiment, the minimum number of resource units is dependent on the number of assigned resource units and, thus, it is compensated for the fact that there is less room for feedback data. The expression "less room" means that there are fewer resource units available for feedback data when the assigned number of resource units is less.

In some embodiments of the method in the first node 110, the minimum number of resource units is based on a number of coded rank indicator symbols. In this manner, occupied, or used, resource units may be compensated for.

In some embodiments of the method in the first node 110, the minimum number of resource units is based on a number of at least one of CQI, PMI and RI information bits, wherein information bits for CQI, PMI and/or RI comprises non-coded data bits for CQI, PMI and/or RI. Hence, the minimum number of resource units is based on the information bits that have not yet been coded. In a next step, the number of coded resource units available for data may be calculated from the information bits that have not yet been coded.

In some embodiments of the method in the first node 110, the method further comprises a step of receiving 210 scheduling information from the second node 120. The scheduling information indicates resource units of the combined feedback and data channel available for use in a subsequent step of sending a plurality of resource units. Optionally, the plurality of resource units comprises at least some of the resource units indicated by the scheduling information. However, in most applications, it may be preferred to use all available resource units.

Figure 9:
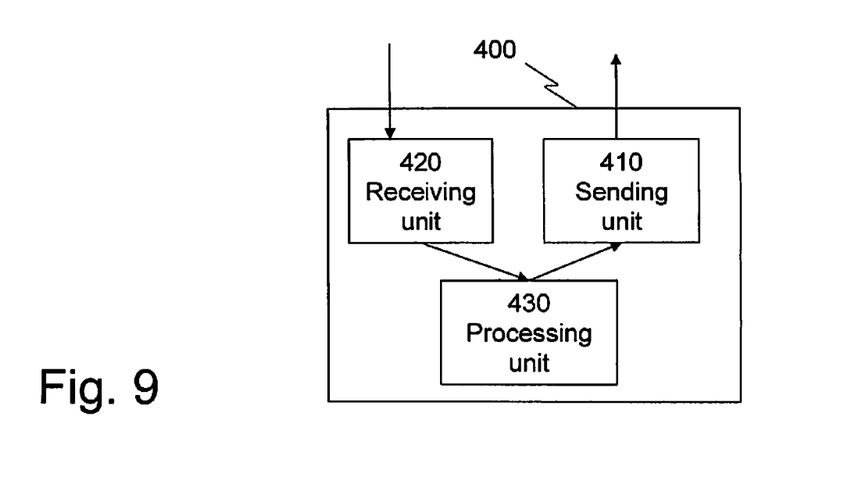
FIG. 9 shows a schematic block diagram over an embodiment of the arrangement in the first node.

With reference to FIG. 9, there is shown a schematic block diagram over an embodiment of the arrangement 400 in the first node 110, such as a mobile terminal, for sending feedback data and user data on a combined feedback and data channel to a second node 120. The first node 110 may comprise the arrangement 400. The feedback data is indicative of channel properties of a data channel for sending data from the second node 120 to the first node 110. A wireless communication system 100 is configured to comprise the first and second nodes 110, 120. The arrangement 400 may comprise a sending unit 410 configured to send a plurality of resource units in a time period on the combined feedback and data channel. Said plurality of resource units comprises information about feedback data and user data. At least a minimum number of resource units are reserved for allocation by the user data. Optionally, the arrangement 400 may comprise a receiving unit 420 and/or a processing unit 430.

In some embodiments of the arrangement 400 in the first node 110, the sending unit 410 may be configured to base the minimum number of resource units on a predetermined number of resource units. Advantageously, simple implementation of the arrangement may be obtained since the predetermined number is static and may be configured in the first node in conjunction with manufacturing of the first node. In this manner, signaling is only increased during configuration of the network, or the radio communication system.

In some embodiments of the arrangement 400 in the first node 110, the sending unit 410 may be configured to base the minimum number of resource units on a ratio of an assigned number of resource units and a dynamic or predetermined numerical value, wherein the assigned number of resource units is assigned by a scheduler, comprised in the second node 120. In this manner, the minimum number of resource units changes as a result of different number of assigned resource units. For example, when the number of assigned resource units is fairly small, it is implied that there is less room for feedback data. With this embodiment, the minimum number of resource units is dependent on the number of assigned resource units and, thus, it is compensated for the fact that there is less room for feedback data. The expression "less room" means that there are fewer resource units available for feedback data when the assigned number of resource units is less.

In some embodiments of the arrangement 400 in the first node 110, the sending unit 410 may be configured to base the minimum number of resource units on a number of coded rank indicator symbols. In this manner, occupied, or used, resource units may be compensated for.

In some embodiments of the arrangement 400 in the first node 110, the sending unit 410 may be configured to base the minimum number of resource units on a number of at least one of CQI, PMI and RI information bits, wherein information bits for CQI, PMI and/or RI comprises non-coded data bits for CQI, PMI and/or RI. Hence, the minimum number of resource units is based on the information bits that have not yet been coded.

In a next step, the number of coded resource units available for data may be calculated from the information bits that have not yet been coded.

In some embodiments of the arrangement 400 in the first node 110, the receiving unit 420 configured to receive scheduling information from the second node 120. The scheduling information indicates resource units of the combined feedback and data channel available for use in a subsequent step of sending a plurality of resource units. Optionally, the plurality of resource units comprises at least some of the resource units indicated by the scheduling information. However, in most applications, it may be preferred to use all available resource units.

Figure 10:
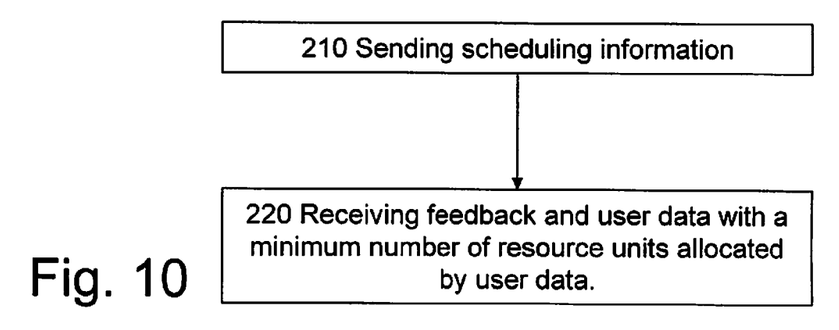
FIG. 10 shows a schematic flow chart over an embodiment of the method in the second node.

Now turning to FIG. 10, there is shown a schematic flow chart over an embodiment of the method in the second node 120, such as a radio network node, for receiving feedback data and user data on a combined feedback and data channel from a first node 110, such as a mobile terminal. The feedback data is indicative of channel properties of a data channel for sending data from the second node 120 to the first node 110. A wireless communication system 100 comprises the first and second nodes 110, 120. The following step may be performed.

In a step 220, the second node 120 receives a plurality of resource units in a time period on the combined feedback and data channel. Said plurality of resource units comprises information about feedback data and user data. At least a minimum number of resource units are reserved for allocation by the user data.

In some embodiments of the method in the second node 120, the minimum number of resource units is based on a predetermined number of resource units. Advantageously, simple implementation of the method may be obtained since the predetermined number is static and may be configured in the second node in conjunction with manufacturing of the second node. In this manner, signaling is only increased during configuration of the network, or the radio communication system.

In some embodiments of the method in the second node 120, the minimum number of resource units is based on a ratio of an assigned number of resource units and a dynamic or predetermined numerical value, wherein the assigned number of resource units is assigned by a scheduler, comprised in the second node 120. In this manner, the minimum number of resource units changes as a result of different number of assigned resource units. For example, when the number of assigned resource units is fairly small, it is implied that there is less room for feedback data. With this embodiment, the minimum number of resource units is dependent on the number of assigned resource units and, thus, it is compensated for the fact that there is less room for feedback data. The expression "less room" means that there are fewer resource units available for feedback data when the assigned number of resource units is less.

In some embodiments of the method in the second node 120, the minimum number of resource units is based on a number of coded rank indicator symbols. In this manner, occupied, or used, resource units may be compensated for.

In some embodiments of the method in the second node 120, the minimum number of resource units is based on a number of at least one of CQI, PMI and RI information bits, wherein information bits for CQI, PMI and/or RI comprises non-coded data bits for CQI, PMI and/or RI. Hence, the minimum number of resource units is based on the information bits that have not yet been coded. In a next step, the number of coded resource units available for data may be calculated from the information bits that have not yet been coded.

In some embodiments of the method in the second node 120, the method further comprises a step of receiving 210 scheduling information from the second node 120. The scheduling information indicates resource units of the combined feedback and data channel available for use in a subsequent step of sending a plurality of resource units. Optionally, the plurality of resource units comprises at least some of the resource units indicated by the scheduling information. However, in most applications, it may be preferred to use all available resource units.

Figure 11:
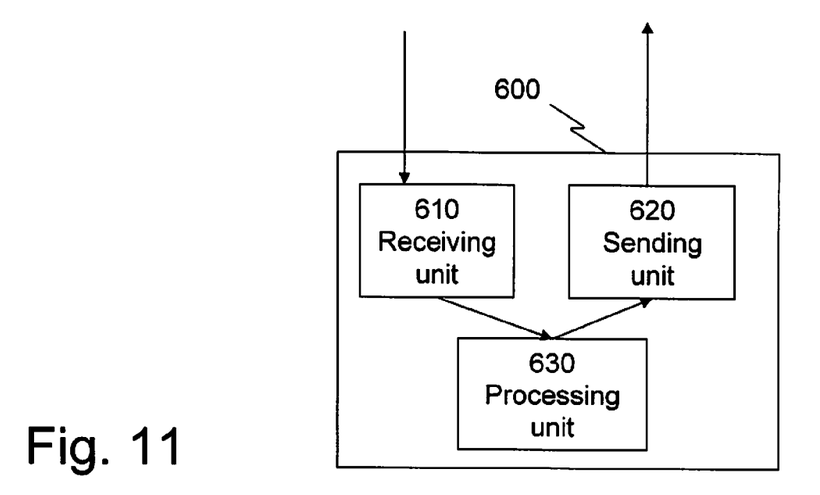
FIG. 11 shows a schematic block diagram over an embodiment of the arrangement in the second node.

In FIG. 11, there is shown a schematic block diagram over an embodiment of the arrangement 600 in the second node 120, such as a radio network node, for receiving feedback data and user data on a combined feedback and data channel from a first node 110, such as a mobile terminal. The second node 120 may comprise the arrangement 600. The feedback data is indicative of channel properties of a data channel for sending data from the second node 120 to the first node 110. A wireless communication system 100 is configured to comprise the first and second nodes 110, 120. The arrangement 600 may comprise a receiving unit 610 configured to receive a plurality of resource units in a time period of the combined feedback and data channel. Said plurality of resource units comprises information about feedback data and user data. At least a minimum number of resource units are reserved for allocation by the user data. Optionally, the arrangement comprises a sending unit 620 and/or a processing unit 630.

In some embodiments of the arrangement 600 in the second node 120, the receiving unit 610 may be configured to base the minimum number of resource units on a predetermined number of resource units. Advantageously, simple implementation of the arrangement 600 may be obtained since the predetermined number is static and may be configured in the second node in conjunction with manufacturing of the second node. In this manner, signaling is only increased during configuration of the network, or the radio communication system.

In some embodiments of the arrangement 600 in the second node 120, the receiving unit 610 may be configured to base the minimum number of resource units on a ratio of an assigned number of resource units and a dynamic or predetermined numerical value, wherein the assigned number of resource units is assigned by a scheduler, comprised in the second node 120. In this manner, the minimum number of resource units changes as a result of different number of assigned resource units. For example, when the number of assigned resource units is fairly small, it is implied that there is less room for feedback data. With this embodiment, the minimum number of resource units is dependent on the number of assigned resource units and, thus, it is compensated for the fact that there is less room for feedback data. The expression "less room" means that there are fewer resource units available for feedback data when the assigned number of resource units is less.

In some embodiments of the arrangement 600 in the second node 120, the receiving unit 610 may be configured to base the minimum number of resource units on a number of coded rank indicator symbols. In this manner, occupied, or used, resource units may be compensated for.

In some embodiments of the arrangement 600 in the second node 120, the receiving unit 610 may be configured to base the minimum number of resource units on a number of at least one of CQI, PMI and RI information bits, wherein information bits for CQI, PMI and/or RI comprises non-coded data bits for CQI, PMI and/or RI. Hence, the minimum number of resource units is based on the information bits that have not yet been coded. In a next step, the number of coded resource units available for data may be calculated from the information bits that have not yet been coded.

In some embodiments of the arrangement 600 in the second node 120, the arrangement 600 further comprises a sending unit configured to send scheduling information to the first node 110. The scheduling information indicates resource units of the combined feedback and data channel available for use in a subsequent step of sending a plurality of resource units. Optionally, the plurality of resource units comprises at least some of the resource units indicated by the scheduling information. However, in most applications, it may be preferred to use all available resource units.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a first node for sending feedback data and user data on a Physical Uplink Shared Channel (PUSCH) to a second node, wherein the feedback data is indicative of channel properties of a data channel for sending data from the second node to the first node, and wherein a wireless communication system comprises the first and second nodes, the method comprising sending, in a time period, feedback data and user data within a plurality of resource units on the PUSCH, by sending said user data within a number of resource units reserved for the user data, said number being based on:
   an assigned number of resource units;
   a number of coded RI (rank indicator) symbols; and
   a number of CQI (channel quality indicator) information bits or RI information bits, wherein the information bits for CQI or RI comprise non-coded data bits for CQI or RI, respectively.

2. The method according to claim 1, further comprising receiving scheduling information from the second node, wherein the scheduling information indicates said assigned number of resource units.

3. The method according to claim 2, wherein the plurality of resource units comprises at least some of the resource units indicated by the scheduling information as being available.

4. The method of claim 1, wherein said number is based on at least said number of coded RI symbols.

5. The method according to claim 1, wherein a resource unit is a coded symbol.

6. The method according to claim 1, wherein said time period comprises a single subframe.

7. The method according to claim 1, further comprising determining a number of resource units to be used for sending said feedback data in said time period on the PUSCH based on a code rate of said user data, wherein said determining comprises limiting the number of resource units to be used for said feedback data so as to reserve said minimum number of resource units for said user data.

8. A first node for sending feedback data and user data on a Physical Uplink Shared Channel (PUSCH) to a second node, wherein the feedback data is indicative of channel properties of a data channel for sending data from the second node to the first node, wherein a wireless communication system is configured to comprise the first and second nodes, and wherein the first node comprises a sending circuit configured to send, in a time period, feedback data and user data within a plurality of resource units on the PUSCH, by sending said user data within a number of resource units reserved for the user data, said number being based on:
   an assigned number of resource units;
   a number of coded RI (rank indicator) symbols; and
   a number of CQI (channel quality indicator) information bits or RI information bits, wherein the information bits for CQI or RI comprise non-coded data bits for CQI or RI, respectively.

9. The first node of claim 8, further comprising a receiving circuit configured to receive scheduling information from the second node, wherein the scheduling information indicates said assigned number of resource units.

10. The first node of claim 9, wherein the plurality of resource units comprises at least some of the resource units indicated by the scheduling information as being available.

11. The first node of claim 8, wherein said number is based on at least said number of coded RI symbols.

12. A method in a second node for receiving feedback data and user data on a Physical Uplink Shared Channel (PUSCH) from a first node, wherein the feedback data is indicative of channel properties of a data channel for sending data from the second node to the first node, and wherein a wireless communication system comprises the first and second nodes, the method comprising receiving, in a time period, feedback data and user data within a plurality of resource units on the PUSCH, by receiving said user data within a number of resource units reserved for the user data, said number being based on:
- an assigned number of resource units;
- a number of coded RI (rank indicator) symbols; and
- a number of CQI (channel quality indicator) information bits or RI information bits, wherein the information bits for CQI or RI comprise non-coded data bits for CQI or RI, respectively.

13. The method according to claim 12, further comprising sending scheduling information to the first node, wherein the scheduling information indicates said assigned number of resource units.

14. The method according to claim 13, wherein the plurality of resource units comprises at least some of the resource units indicated by the scheduling information as being available.

15. The method of claim 12, wherein said number is based on at least said number of coded RI symbols.

16. A second node for receiving feedback data and user data on a Physical Uplink Shared Channel (PUSCH) from a first node, wherein the feedback data is indicative of channel properties of a data channel for sending data from the second node to the first node, wherein a wireless communication system is configured to comprise the first and second nodes, and wherein the second node comprises a receiving circuit configured to receive, in a time period, feedback data and user data within a plurality of resource units on the PUSCH, by receiving said user data within a number of resource units reserved for the user data, said number being based on:
- an assigned number of resource units;
- a number of coded RI (rank indicator) symbols; and
- a number of CQI (channel quality indicator) information bits or RI information bits, wherein the information bits for CQI or RI comprise non-coded data bits for CQI or RI, respectively.

17. The second node of claim 16, further comprising a sending circuit configured to send scheduling information to the first node, wherein the scheduling information indicates said assigned number of resource units.

18. The second node of claim 17, wherein the plurality of resource units comprises at least some of the resource units indicated by the scheduling information as being available.

19. The second node of claim 16, wherein said number is based on at least said number of coded RI symbols.

20. The method according to claim 19, further comprising limiting the number of coded symbols to be used for sending said feedback data in said time period on the PUSCH so as to guarantee that the number of resource units are used for sending said user data in said time period on the PUSCH no matter the number of non-coded data bits representing said feedback data.

21. The method according to claim 20, wherein the wireless communication system is a Long Term Evolution (LTE) system, and wherein a resource unit comprises one or more Orthogonal Frequency Division Multiplexing (OFDM) sub-carriers during one or more OFDM symbol intervals within said single subframe.

* * * * *